(12) United States Patent
Shimizu et al.

(10) Patent No.: US 6,832,662 B2
(45) Date of Patent: Dec. 21, 2004

(54) ELECTRIC MOTOR ASSIST TYPE POWER STEERING APPARATUS

(75) Inventors: Yasuo Shimizu, Wako (JP); Katsuji Watanabe, Wako (JP); Yasuhiro Terada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/695,150

(22) Filed: Oct. 27, 2003

(65) Prior Publication Data

US 2004/0094353 A1 May 20, 2004

Related U.S. Application Data

(62) Division of application No. 10/079,610, filed on Feb. 19, 2002, now abandoned.

(30) Foreign Application Priority Data

Mar. 5, 2001 (JP) ........................................ 2001-060266

(51) Int. Cl.[7] .............................................. B62D 5/04
(52) U.S. Cl. ............................ 180/444; 74/409; 74/427
(58) Field of Search ........................... 180/444; 74/409, 74/425, 427

(56) References Cited

U.S. PATENT DOCUMENTS

| 3,664,718 A | 5/1972 | Uhtenwoldt |
| 3,932,960 A | 1/1976 | Edgar et al. |
| 4,611,934 A | 9/1986 | Piotrowski et al. |
| 6,527,642 B1 * | 3/2003 | Arai et al. .................. 464/104 |
| 2002/0084136 A1 * | 7/2002 | Fowlkes et al. ............. 180/428 |

FOREIGN PATENT DOCUMENTS

| JP | 03249451 A | * 11/1991 | ............. F16H/1/16 |
| JP | 05065944 A | * 3/1993 | ............. F16H/1/16 |

OTHER PUBLICATIONS

Patent Abstracts of Japan. Publication No. 11–043062. Electric Power Steering Unit. Feb. 16, 1999.

* cited by examiner

*Primary Examiner*—Daniel G. DePumpo
(74) *Attorney, Agent, or Firm*—Merchant & Gould P.C.

(57) ABSTRACT

An electric power steering apparatus with an electric motor generating an assistant steering force for transmission to the steering system, a worm shaft rotated by the electric motor, a worm gear on the worm shaft that rotates therewith, a worm wheel rotated by the worm gear, a pinion shaft that rotates with the worm gear, supporting units that support both ends of the worm shaft so as to allow rotation thereof, and a distortion prevention unit that prevents distortion of the worm shaft. The supporting units may support the ends of the worm shaft without play.

6 Claims, 8 Drawing Sheets

ELECTRIC MOTOR ASSIST TYPE POWER STEERING APPARATUS

This application is a divisional of application Ser. No. 10/079,610, filed 19 Feb. 2002, now abandoned, which application(s) are incorporated herein by reference.

BACKGROUND OF THE INVENTION

1. Field of the Invention

The present invention relates to an electric motor assist type power steering apparatus. More specifically, the present invention relates to an electric-motor-controlled power steering apparatus, which reduces the steering effort of a driver by applying power (steering torque) generated by an electric motor to a steering system.

2. Prior Art

An electric motor assist type power steering apparatus (hereinafter defined as "power steering apparatus") supplies an assistant steering force to a steering system in order to assist a driver in turning a steering wheel. Vehicles equipped with power steering apparatus are in widespread use. In such vehicles, since smooth turning of the steering wheel is enabled by the power steering apparatus, the driver can turn the steering wheel with ease.

As an example of these kinds of power steering apparatus, a pinion assist type electric power steering apparatus, in which a worm shaft and a worm wheel are used in order to transmit an assistant steering force generated by an electric motor to a steering shaft, is known. The power steering apparatus, disclosed in the Japanese patent unexamined patent publication H11-43062, is one example thereof.

Figure 8:
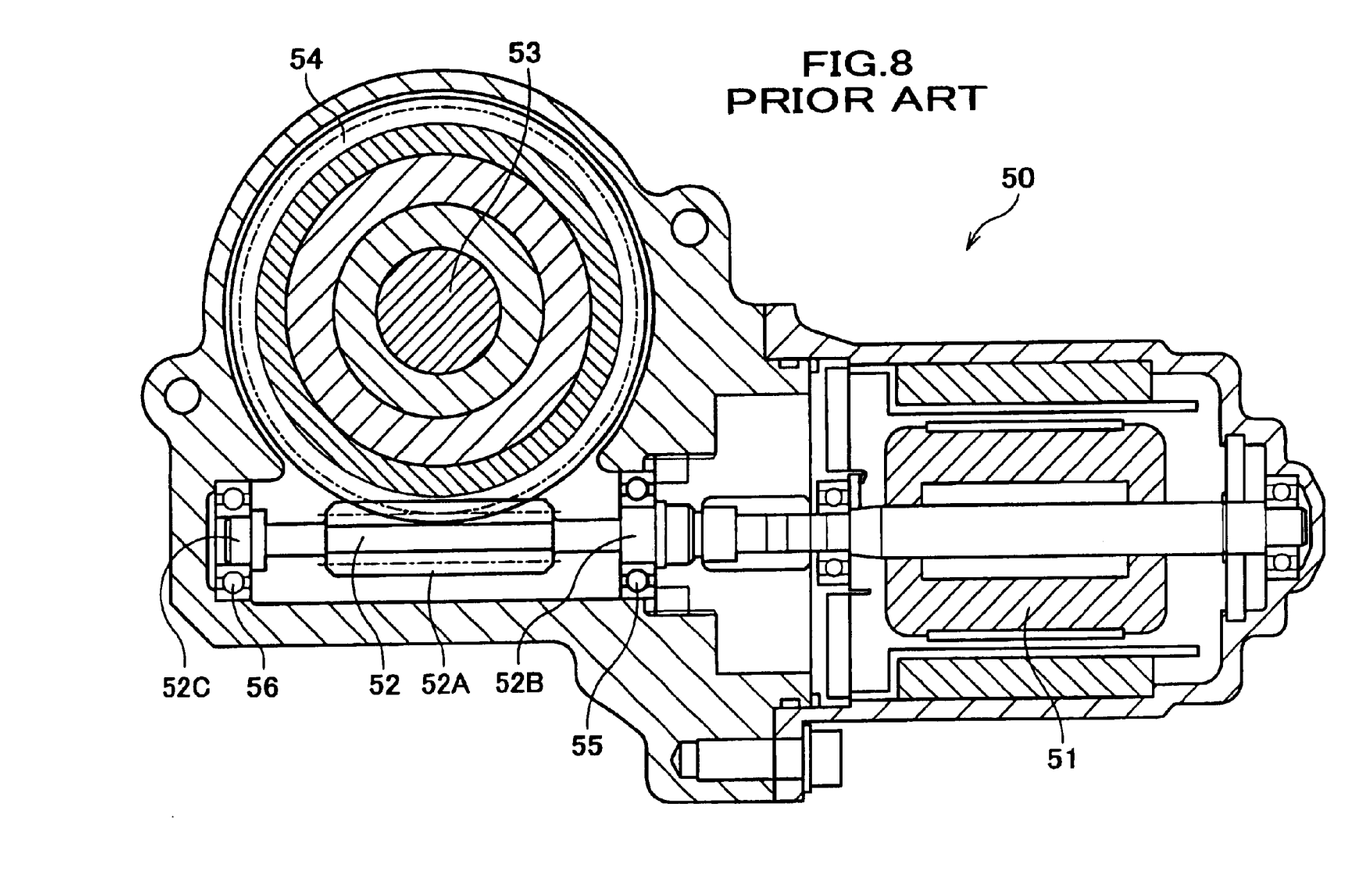
FIG. 8 is a cross-sectional view of a part of a conventional electric power steering system.

In this power steering apparatus, as shown in FIG. 8, an electric motor 51, which is used to provide an assistant steering force to a steering shaft, is provided. When the steering wheel is rotated in order to turn the steering shaft, the electric motor 51 supplies the assistant steering force to help rotate the steering shaft. The electric motor 51 is connected to a worm shaft 52. A worm gear 52A of the worm shaft 52 is engaged with a worm wheel 54, which is coaxially arranged with respect to a pinion shaft 53.

Ends 52B and 52C of the worm shaft 52 are supported by ball bearings 55 and 56. The assistant steering force generated by the electric motor 51 is transferred to the pinion shaft 53 through the worm gear 52A and the worm wheel 54, which are engaged with each other. Thereby, the effort that must be exerted by a driver to turn the steering wheel is alleviated by the assistant steering force.

In the power steering apparatus 50 disclosed in the above described. Japanese unexamined patent application, however, ends 52B and 52C of the worm shaft 52 are only supported by ball bearings 55 and 56, with the occurrence of backlash.

Therein, since the flexural rigidity (also referred to as flexural resistance, the capacity of an object to resist flexing when stress is applied to thereto) of the worm shaft 52 is relatively low, the worm shaft 52 tends to be easily deformed by the load applied to the worm shaft 52. Therefore, when the steering wheel is turned back in the other way, since the steering torque sensed by a torque sensor (not shown) decreases, the electric motor 51 is controlled so as to provide a decreased assistant steering force.

It is desirable to enable the steering wheel to be turned back smoothly, by rotating the electric motor 51 through the worm wheel 54 and worm shaft 52. But, if the worm shaft 52 has flexed, since the assistant steering force has decreased, the bending moment for affecting the worm shaft 52 decreases. When a restoring force is applied to the worm shaft 52, restorative deformation of the worm shaft 52 occurs.

Since the restorative deformation disturbs the rotation of the worm gear 52A, the assistant steering force from the electric motor 51 is not transmitted to the worm wheel 54. Thus, the proper relationships between the torque sensor, the control unit, and the electric motor 51 are impaired. These relationships are further impaired due to the moment of the inertia of the electric motor 51. Thus, the operational ability of the steering wheel is becomes worse.

In the electric power steering apparatus 50, moreover, an excessive gap or clearance may develop between the worm gear 52A and the worm wheel 54 as the worm shaft 52 flexes. When such clearance arises, the backlash between the worm gear 52A and the worm wheel 54 can become large. Thus, the assistant steering force generated by the electric motor 51 cannot be transferred completely to the steering shaft.

These disadvantages caused by the distortion of the worm shaft 52 are especially pronounced when the assistant steering force generated by the electric motor 51 is large.

SUMMARY OF THE INVENTION

The present invention relates to an electric power steering apparatus, that transmits a steering force to be added to the steering wheel, in compliance with the steering force exerted by the driver.

This electric power steering apparatus includes an electric motor for generating the assistant steering force, a worm shaft engaged with the electric motor so as to be rotated thereby, a worm gear disposed on the worm shaft and engaged therewith so as to rotate therewith, a worm wheel engaged with the worm gear on the worm shaft so as to be rotated by the worm gear, and a pinion shaft engaged with the worm wheel so as to rotate therewith. The present invention also includes a rack shaft engaged with at least one steered wheel so as to displace the steered wheel in an axial direction of the rack shaft, and first and second supporting units supporting the first and second ends of the worm shaft. The present invention further includes a distortion prevention unit engaged with the worm shaft at the middle thereof.

In the electric power steering apparatus according to the present invention, both ends of the worm shaft are supported by the supporting units without play. Thus, the worm shaft can be supported with high flexural rigidity.

Accordingly, since distortion of the worm shaft is avoided, the steering force generated by the electric motor may be reliably transferred to the pinion shaft. Difficulties with the operational ability of the steering wheel thus may be avoided.

In the electric power steering apparatus, preferably, each of the supporting units is composed of ball bearings for supporting their respective ends of the worm shaft.

According to this electric power steering apparatus, both ends of the worm shaft are supported without play using ball bearings. Thus, the worm shaft can be rotated while being well supported. Because ball bearings are general-purpose parts, this may be accomplished without using specialized parts. Consequently, a cost reduction may be attained.

Alternatively, in the electric power steering apparatus, preferably, the supporting units include ball bearings which support the first end of the worm shaft, and a needle bearing which supports the second end of the worm shaft.

According to this electric power steering apparatus, the first end of the worm shaft that is joined with the electric motor is supported by ball bearings. Since the first end of the worm shaft is joined with the electric motor, flexural rigidity in the first end of the worm shaft is comparatively high. However, if left unsupported, the flexural rigidity of the other end becomes relatively low.

In the present electric power steering apparatus, therefore, the second end of the worm shaft is supported by a needle bearing, without play. When the worm shaft is supported by the needle bearing without play, the flexural rigidity along the worm gear as a whole may be higher. Difficulties with the operational ability of the steering wheel thus may be avoided.

Furthermore, the present invention relates to an electric power steering apparatus including an electric motor generating an assistant steering force to be added to the steering system, a worm shaft engaged with the electric motor so as to be rotated thereby, a worm gear disposed on the worm shaft and engaged with the worm shaft so as to rotate therewith, a worm wheel engaged with the worm gear on the worm shaft so as to be rotated by the worm gear, pinion shaft engaged with the worm wheel so as to rotate therewith, and a rack shaft engaged with at least one steered wheel so as to displace the steered wheel along the axial direction of the rack shaft. First and second supporting units support the first and second ends of the worm shaft while allowing rotation of the worm shaft, and a distortion prevention unit is engaged with the middle of the worm shaft while allowing rotation of the worm shaft.

The electric motor, worm wheel, and supporting units may be referred to collectively as a torque transmission unit.

According to this electric power steering apparatus, the middle in the longitudinal direction of the worm shaft is supported by the distortion prevention unit while allowing rotation of the worm shaft. Thus, the worm shaft can be made to rotate, and distortion of the worm shaft can be prevented. Thus, difficulties with the operational ability of the steering wheel thus may be avoided, and the steering force generated by the electric motor can be transmitted reliably to the pinion shaft. With the use of a distortion prevention unit, the supporting unit at the first end of the worm shaft may be omitted, and the assembling efficiency of the apparatus as a whole is improved.

In the electric power steering apparatus, it is preferable that the distortion prevention unit includes an engagement assistor, which pushes the worm shaft into engagement against the worm wheel.

According to the present invention, since the engagement assistor pushes the worm shaft into engagement with the worm wheel, distortion of the worm shaft is prevented, and the worm shaft is pressed to the worm wheel with sufficient force so that the clearance between the worm shaft and the worm wheel is maintained within the predetermined range. The occurrence of the unpleasant backlash between the worm gear and the worm wheel can be prevented, and the rotation force of the worm shaft can be reliably transmitted to the worm wheel.

In the electric power steering apparatus, it is preferable that the engagement assistor includes a first roller, a second roller adjacent to the first roller, and a spring that pushes the first and second rollers against the worm shaft.

In this electric power steering apparatus, the worm shaft is pushed against the worm wheel with the worm shaft central to the first roller and the second roller. Thus, displacement of the worm shaft in an up-and-down direction is restricted, and the engagement assistor engages the worm shaft is with the worm wheel. Since rollers are used, friction is low, and the rotation of the worm shaft is not prevented.

DESCRIPTION OF THE PREFERRED EMBODIMENT

First Preferred Embodiment

Figure 1:
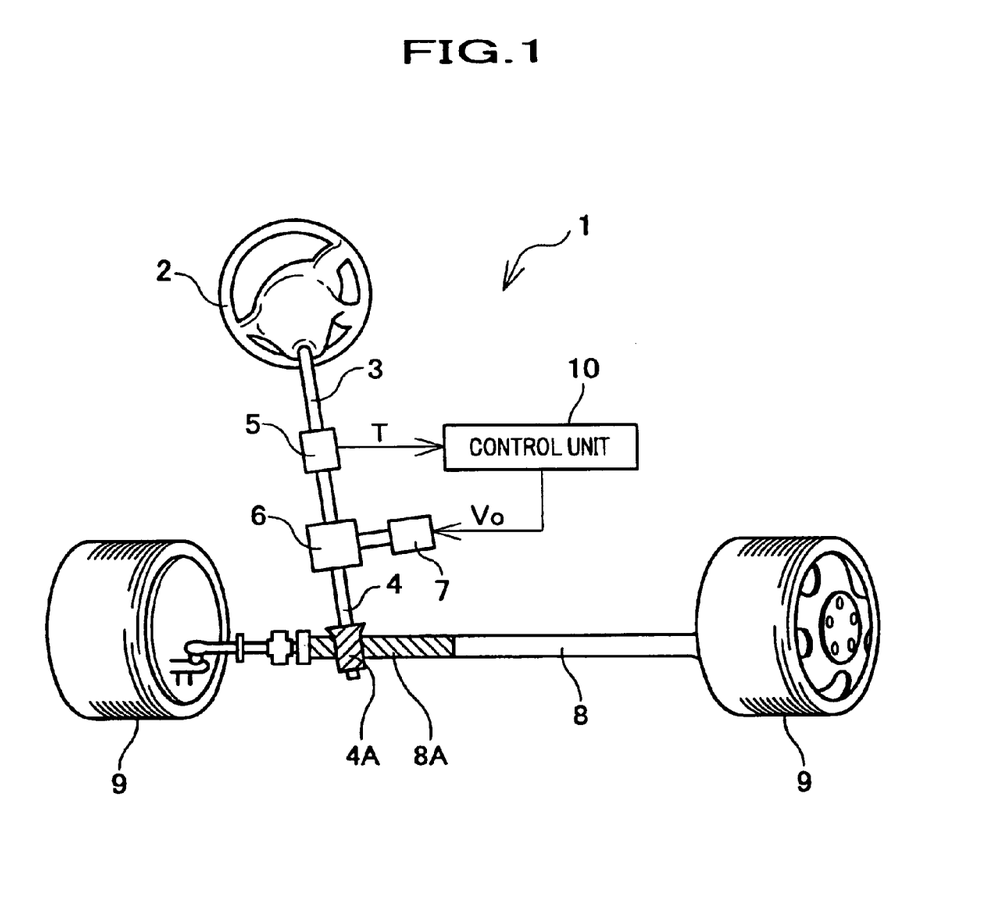
FIG. 1 is a block diagram showing the whole of the electric power steering apparatus according to the first preferred embodiment of the present invention.
Figure 2:
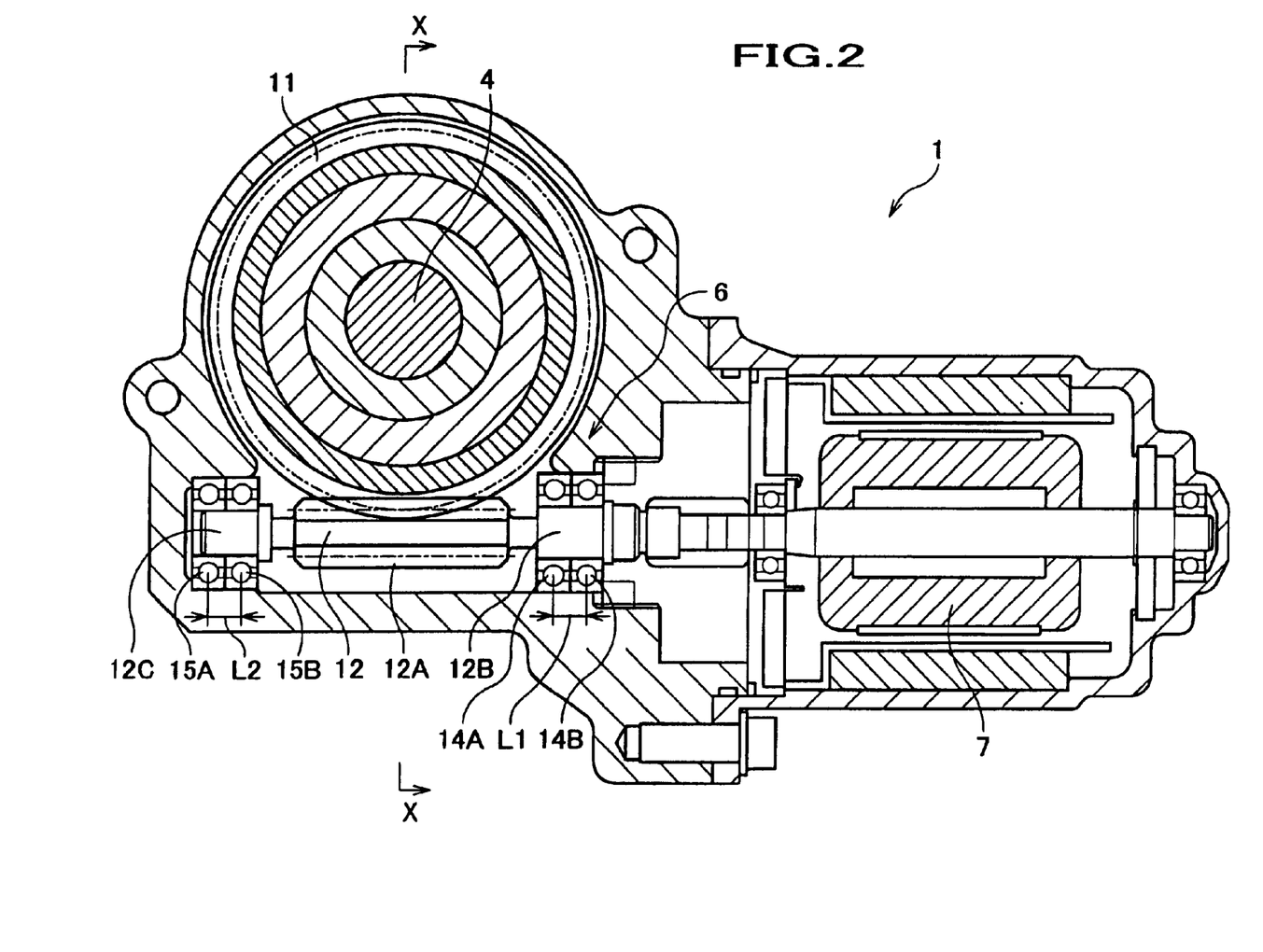
FIG. 2 is a plane view of a part of the electric power steering apparatus according to the first preferred embodiment of the present invention.
Figure 3:
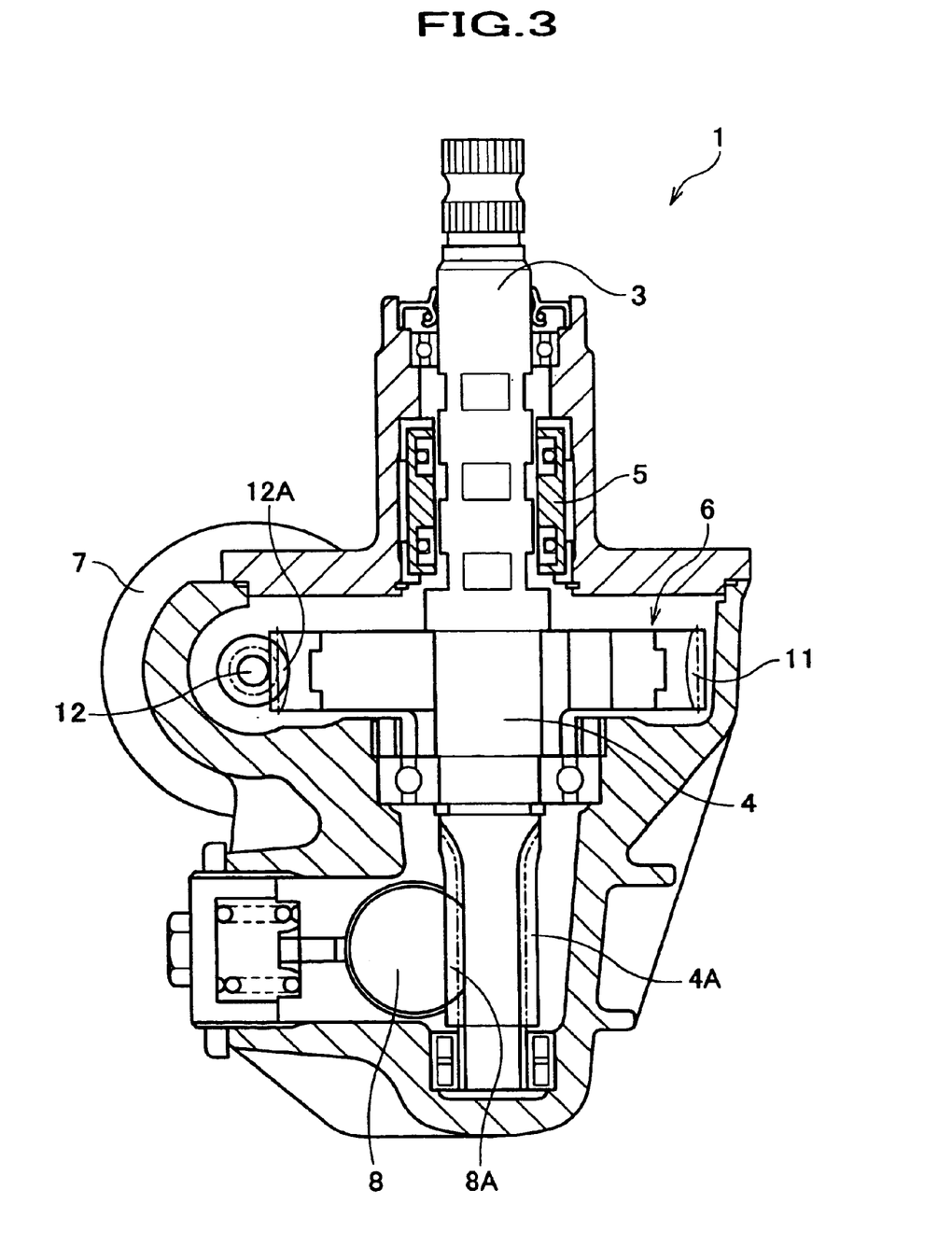
FIG. 3 is a sectional view along the line X—X in FIG. 2.

The preferred embodiments of the present invention will now be described by referring to the attached drawings. FIG. 1 is a block diagram showing the whole of the electric power steering apparatus according to the first preferred embodiment of the present invention. FIG. 2 is a plane view of the principal part of the electric power steering apparatus according to the first preferred embodiment of the present invention. FIG. 3 is a sectional view along the line X—X in FIG. 2.

As shown in FIG. 1, an electric power steering apparatus 1 according to the present invention has a steering wheel 2. The steering wheel 2 is connected to a pinion shaft 4 through a steering shaft 3. A torque sensor 5 and a torque transmitter 6 are provided to the pinion shaft 4. The torque sensor 5 detects the steering torque to be added to the steering system (that is, to the steering shaft 3). The torque transmitter 6 is connected to an electric motor 7, and transmits an assistant steering force generated by the electric motor 7 to the steering system.

A pinion 4A, arranged at the bottom part of the pinion shaft 4, is engaged with a gear rack 8A provided on a rack shaft 8. In this construction, the rotation of the pinion shaft 4 is changed into a movement in a longitudinal direction with respect to the rack shaft 8. Thus, steered wheels 9 are steered in compliance with the rotation of the pinion shaft. The torque sensor 5 is connected to a control unit 10, and outputs the toque signal T to the control unit 10. The control unit 10 computes an assistant steering force using the torque signal T from the torque sensor 5, and outputs an electric motor control signal $V_0$ to the electric motor 7. Thus, the rotation of the electric motor 7 is controlled by the motor control signal $V_0$.

As shown in FIG. 2 and FIG. 3, the torque transmitter 6 has a worm wheel 11, which is coaxially provided to the pinion shaft 4. The worm wheel 11 is engaged with a worm gear 12A provided on the worm shaft 12. That is, the pinion shaft 4 is connected to the electric motor 7 through the worm wheel 11 and worm gear 12A.

When the electric motor 7 is operated and the worm shaft 12 is rotated, a rotation torque (assistant steering force) generated by the electric motor 7 is transferred to the worm wheel 11 through the worm gear 12A, and thus the pinion shaft 4 is rotated in compliance with the rotation of the worm shaft. Thereby, the steering force of the steering shaft 3 is enhanced.

The first end 12B of the worm shaft 12 is supported by a first supporting unit including a first ball bearing 14A and a second ball bearing 14B, which are arrayed along the longitudinal direction of the worm shaft 12, so as to allow rotation of the worm shaft 12.

These ball bearings 14A and 14B support the first end 12B of the worm shaft 12 with sufficient flexural rigidity. In other words, ball bearings 14A and 14B restrict the flexure of the worm shaft 12, which also may be referred to as radial run-out of the worm shaft 12.

The second end 12C of the worm shaft 12 is supported by a second supporting unit including a first ball bearing 15A and a second ball bearing 15B, which are arrayed along the longitudinal direction of the worm shaft 12, so as to allow rotation of the worm shaft 12.

Ball bearing 15A and 15B support the second end 12C of the worm shaft 12 with sufficient flexural rigidity. In other words, the holding means restricts the flexure of the worm shaft 12.

As shown, the location interval L1 between ball bearings 14A and 14B and the location interval L2 between ball bearings 15A and 15B are the same. The location interval L1 and the location interval L2 may be made large, as long as the bearings still restrict the flexure of the worm shaft 12 efficiently, so as to prevent radial run-out of the worm shaft.

The function and the operation of the electric power steering apparatus having the above-described construction is explained as follows.

When the steering wheel 2 is turned by a driver, the torque sensor 5 detects the steering torque and generates the torque signal T. The torque signal T is supplied to the control unit 10.

The control unit 10 computes an assistant steering force to be applied to the steering system based on the torque signal T and in consideration of the traveling speed of the vehicle and the turning angle of the steering wheel. Then the control unit 10 outputs the motor control signal $V_0$, which is generated based on the computed assistant steering force.

As shown in FIG. 2, the electric motor 7 is activated in compliance with the motor control signal Vo, and rotates the worm shaft 12. Since in this instance the first end 12B of the worm shaft 12 is supported by ball bearings 14A and 14B while the worm shaft 12 is rotating, and the second end 12C of the worm shaft 12 is also supported by ball bearings 15A and 15B, the worm shaft 12 may be rotated without radial run-out.

An explanation of the flexural resistance of the worm shaft 12, considering the worm shaft 12 as a beam, is now provided.

Figure 4A:
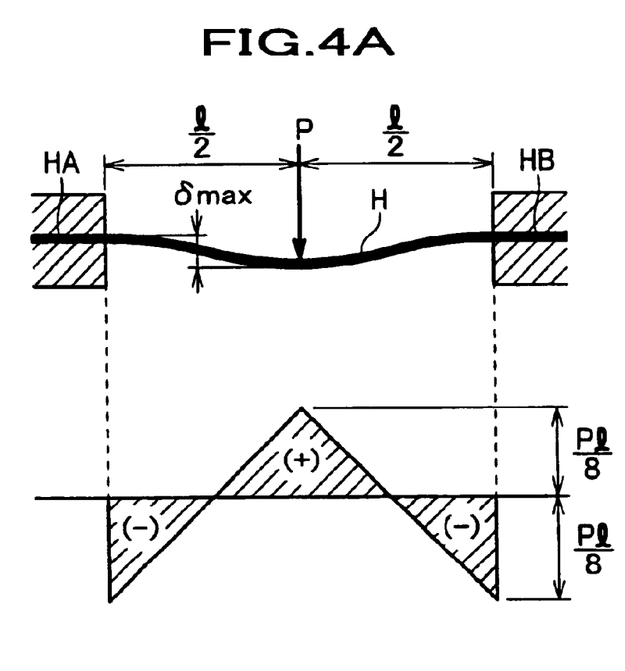
FIG. 4A is an explanatory view of the model of the beam, both ends of which are held without play, and the bending moment applied to the beam.

FIG. 4A is an explanatory view of the bending moment applied to a beam H that is generated when a force P is applied from above to the center of a beam in a longitudinal direction. Here, both ends of the beam are rigidly held without play.

As shown in FIG. 4A, the bending moment added to the beam H, which has a length l, with both ends HA and HB held rigidly without play, is Pl/8.

Figure 4B:
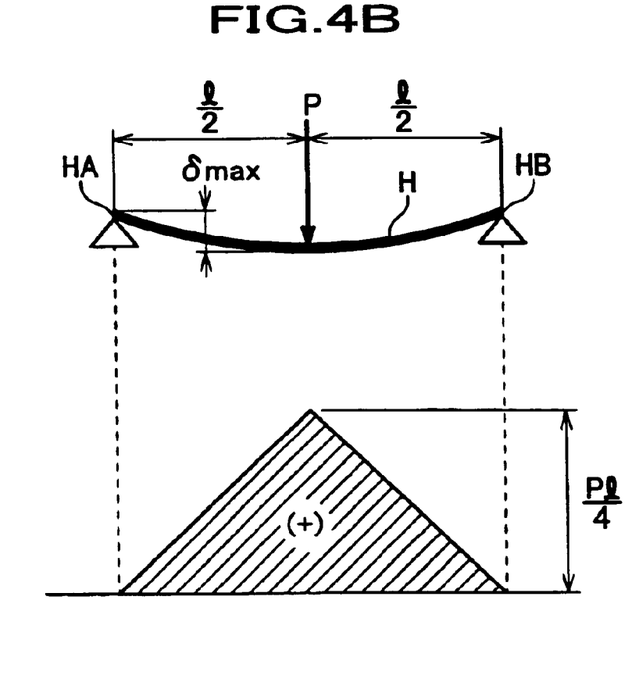
FIG. 4B is an explanatory view of the model of the beam, both ends of which are held with play, and the bending moment applied to the beam.

As shown in FIG. 4B, the bending moment added to the beam H, which has a length l, with both ends HA and HB held rigidly with play, is Pl/4.

The bending moment applied to the beam H. with both ends HA and HB supported without play is one half the bending moment when both ends HA and HB of the beam H are supported with play. Thus, when both end parts HA and HB of the beam H are rigidly held without play, the bending moment may be made smaller than when both ends HA and HB are supported with play.

The maximum amount of distortion of the beam H (hereinafter "maximum distortion", or $\delta_{max}$), when a force P is applied from above to the center of the beam H in the longitudinal direction, wherein both ends HA and HB are rigidly held without play, is formulated as formula (1).

$$\delta_{max} = Pl^3/192EI_z \tag{1}$$

P: the force added to the beam H
l: the length of the beam H
E: Young's modulus
$I_z$: geometrical moment of inertia However, when the force P is applied from above to the center of the beam in the longitudinal direction, wherein both ends HA and HB are held with play, the maximum flexural amount $\delta_{max}$ of the beam H is formulated as formula (2).

$$\delta_{max} = Pl^3/48EI_z \tag{2}$$

P: the force applied to the beam H
l: the length of the beam H
E: Young's modulus
$I_z$: geometrical moment of inertia Thus, the amount of distortion of the beam H with both ends supported without play one fourth as in the case where both ends are supported with play. Thus, with both ends HA and HB of the beam H supported without play, the amount of distortion of the beam H can be made smaller than with both ends supported with play. Thus, sufficient flexural rigidity and high flexure resistance can be achieved when both ends of the beam are supported without play.

Therefore, if both end parts of the beam H are supported without play, the beam may be provided with sufficient rigidity and the distortion of the beam H can be small.

In the first preferred embodiment of the power steering apparatus 1, the worm shaft 12 is supported by ball bearings 14A, 14B, 15A and 15B without play. Thus, the worm shaft 12 according to the present invention can be supported with superior rigidity as compared to a conventional holding manner.

In the present embodiment, therefore, when the electric motor 7 is operated and the force P is applied to the center in the longitudinal direction of the worm shaft 12 as a result thereof, the bending moment is one half what it would be if the ends of the worm shaft 12 were not supported, and the maximum distortion of the worm shaft 12 is one fourth what it otherwise would be. Thus, excessive distortion of the worm shaft 12 is reliably prevented.

Therefore, defects caused in conventional power steering systems by distortion of the worm shaft when the steering wheel is turned back in the reverse direction are avoided in the present embodiment. Consequently, the assistant steering force generated by the electric motor 7 is reliably transferred to the steering shaft 3.

In the present embodiment, when the weight of the electric motor 7 is high, the distortion at the first end 12B of the worm shaft 12 may differ from that at the end 12C.

In this case, if the worm shaft 12 is firmly connected to the rotation axis of the electric motor 7, the distortion at the first end 12B of the worm shaft 12 is lower than at the second end 12C. In this case, it is preferable that the location interval L2 between the ball bearings 15A and 15B is made to be wider than the location interval L1 between ball bearings 14A and 14B, in order to compensate for the rigidity at first end 12B being higher than at the second end 12C.

Thereby, since each end 12B and 12C is supported with uniform flexural rigidity, radial run-out of the worm shaft 12 can be reliably avoided.

Second Preferred Embodiment

Figure 5:
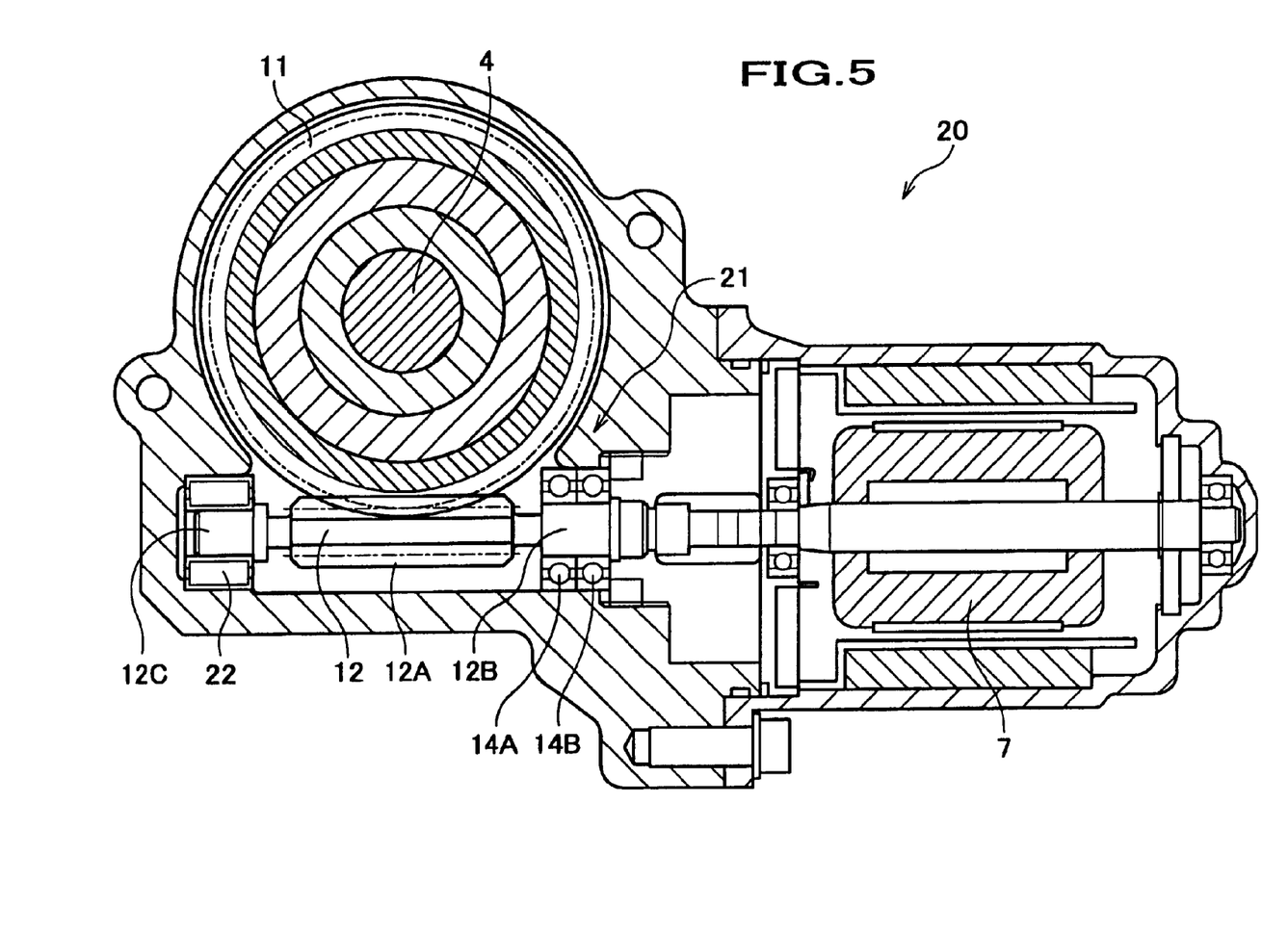
FIG. 5 is a plane view of a part of the electric power steering apparatus according to the second preferred embodiment of the present invention.

The second preferred embodiment according to the present invention is now described. FIG. 5 is a plane view showing a substantial part of the power steering apparatus according to the second preferred embodiment of the present invention.

In a power steering apparatus 20 according to the second preferred embodiment, only the construction of the torque transmitter differs from that of the first preferred embodiment. The following explanation mainly addresses the construction of the torque transmitter, and components that are the same as as those already explained in the first preferred embodiment are indicated by the same symbol.

As shown in FIG. 5, the torque transmitter 21 has a worm wheel 11, which is coaxially provided on the pinion shaft 4.

The worm wheel 11 is engaged with a worm gear 12A provided on the worm shaft 12, which is connected to an electric motor 7.

When the worm shaft 12 is rotated in compliance with the rotation of the electric motor 7, the worm wheel 11 engaged with the worm gear 12A is rotated, and the pinion shaft 4 thus is rotated along with the worm wheel 11. Thereby, the assistant steering force (rotation torque) is transmitted to the pinion shaft 4.

In the second embodiment, the first end 12B of the worm shaft 12 is supported by ball bearings 14A and 14B which are arrayed along the longitudinal direction of the worm shaft 12, so as to permit the worm shaft to rotate.

On the other hand, the second end 12C of the worm shaft 12 is supported by a needle bearing 22 so as to allow the worm shaft 12 to rotate. In the second preferred embodiment of the power steering apparatus 20, the provision of the needle bearing 22 differs differs from the first preferred embodiment.

In the power steering apparatus 20 the first end 12B of the worm shaft 12 is supported without play by ball bearings 14A and 14B, and the second end 12C of the worm shaft 12 is supported without play by the needle bearing 22.

As can be seen from FIG. 5, the needle bearing 22 is provided at both sides of the worm shaft 12 so that the needle bearing 22 is located along the longitudinal direction of the worm shaft 12. Thus, the contact area between the needle bearing 22 and the worm shaft 12 becomes wide as compared to the contact area between the worm shaft 12 and the ball bearings 14A and 14B.

Thereby, since the bearing capacity at the second end 12C of the worm shaft 12 becomes higher than at the first end 12B, end 12C of the worm gear 12 is supported with superior rigidity than end 12B.

However, the rigidity at both ends 12B and 12C can be made uniform if the worm shaft 12 is connected to the electric motor 7 so as to also make rigidity at the first end 12B high, as described above.

Thereby, distortion of the worm shaft may be prevented. In addition, the feeling gap, that is, the difference between the impression when the steering wheel is turned in the anticlockwise direction and the impression when the steering wheel is turned in the clockwise direction, can be decreased. Since the assistant steering force is reliably transferred to the steering shaft 3, the operational ability of the steering wheel is not impaired.

Third Preferred Embodiment

Figure 6:
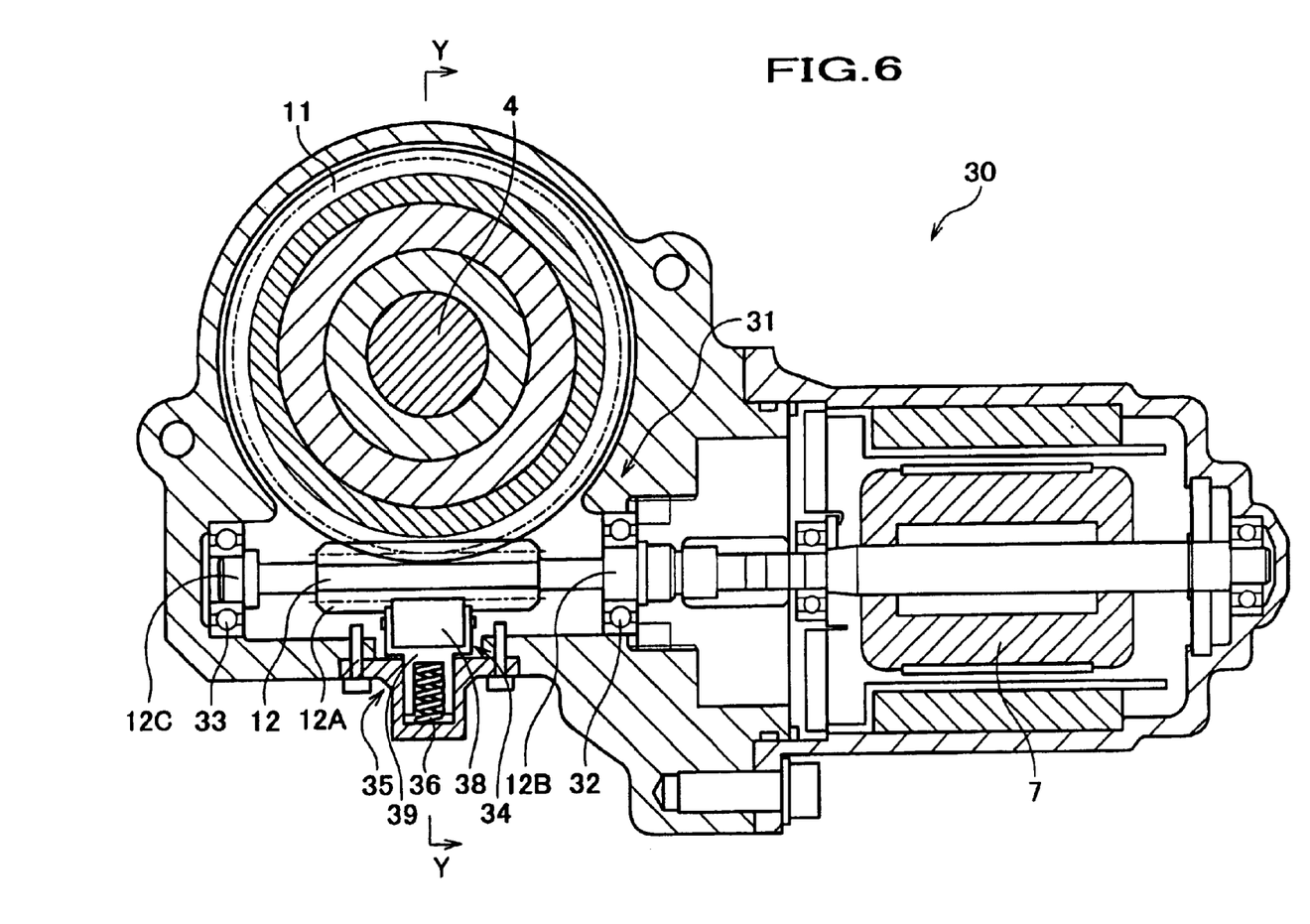
FIG. 6 is a plane view of a part of the electric power steering apparatus according to the third preferred embodiment of the present invention.
Figure 7:
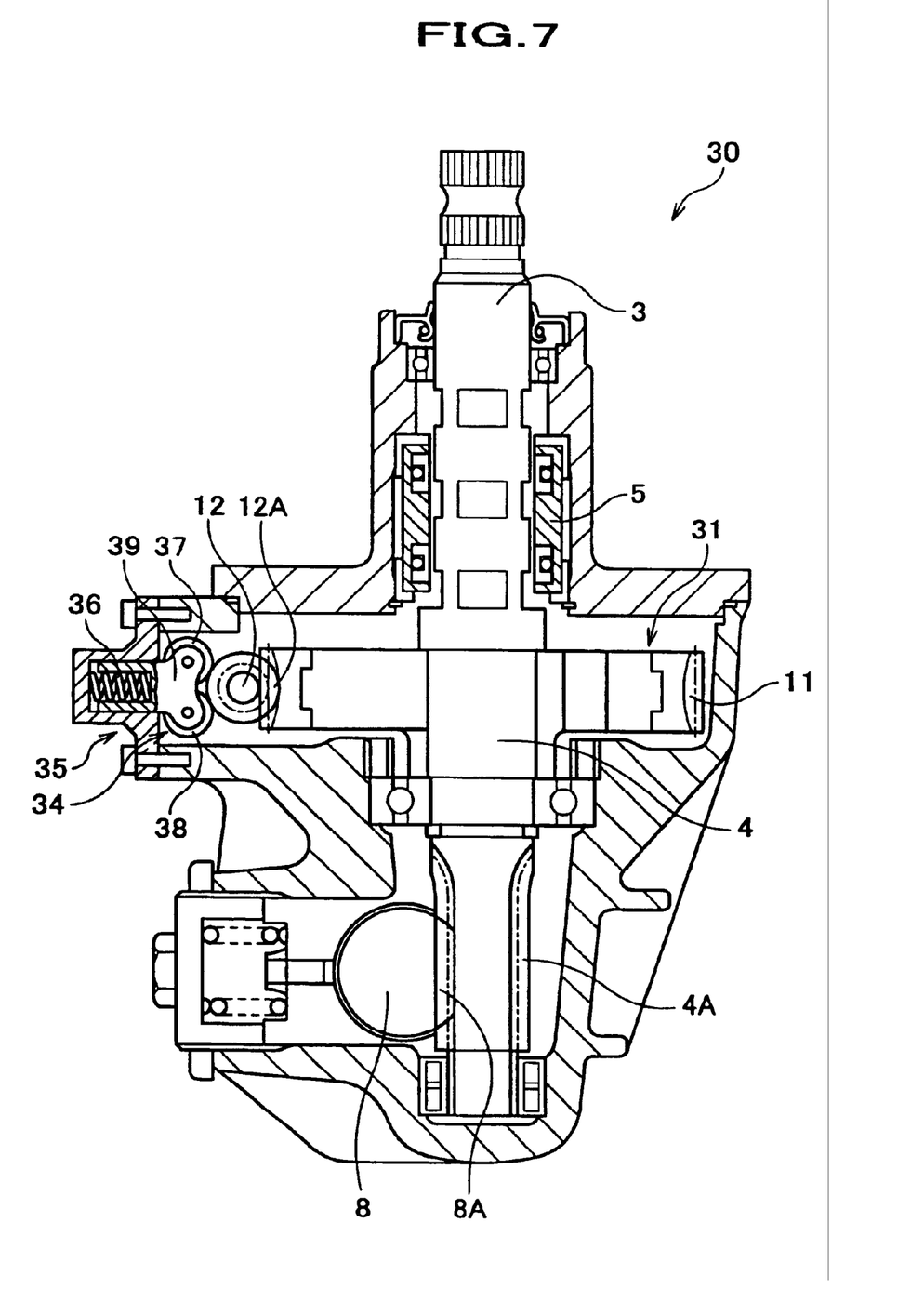
FIG. 7 is a sectional view along the line Y—Y in FIG. 6.

The third preferred embodiment of the present invention is now explained. FIG. 6 is a plane view of a substantial part of the power steering apparatus according to the third preferred embodiment of the present invention. FIG. 7 is sectional view along the line Y—Y in FIG. 6.

In the power steering apparatus 30 according to the third preferred embodiment, only the construction of the torque transmitter differs from the first preferred embodiment of the power steering apparatus 1. Thus, in the following explanation, the explanation is mainly addressed to the different components, and discussion regarding components that are the same as those explained in the first embodiment is omitted, those components being identified using the same symbol as in the first preferred embodiment.

As shown in FIG. 6, a torque transmitter 31 according to the third preferred embodiment of the electric power steering apparatus 30, has a worm wheel 11, which is coaxially provided on the pinion shaft 4.

The worm wheel 11 is engaged with a worm gear 12A provided on the worm shaft 12, which is connected to an electric motor 7.

When the worm shaft 12 is rotated by the electric motor 7, the worm wheel 11 engaged with the worm gear 12A is rotated, and the pinion shaft 4 is rotated together with the worm wheel 11. Thereby, the assistant steering force (rotation torque) is transmitted to the pinion shaft 4.

In the third preferred embodiment, the first end 12B of the worm shaft 12 is supported by a ball bearing 32 so as to permit rotation of the worm shaft 12. The second end 12C is supported by a ball bearing 33 so as to permit rotation of the worm shaft 12.

A distortion prevention unit 35 is provided at the middle in the longitudinal direction of the worm shaft 12. The distortion prevention unit 35 is positioned on the opposite side of the worm shaft 12 with respect to the worm wheel 11. That is, the worm shaft 12 is located between the worm wheel 11 and the distortion prevention unit 35. The distortion prevention unit has an engagement assistor 34 which pushes the worm shaft 12 toward the pinion shaft 4 so that the worm gear 12A is engaged with the worm wheel 11. The distortion prevention unit 35 is composed of a spring 36, and upper roll 37, a lower roll 38, and a roller holder 39 (see FIG. 7).

As shown in FIG. 7, the upper roll 37 and the lower roll 38 are rotatably supported by the roller holder 39. The upper roll 37 and the lower roll 38 are pushed toward the worm shaft 12 by the spring 36 and come in contact with the worm gear 12A. Thus the worm gear 12A is reliably pushed toward the worm wheel 11. In the third preferred embodiment, the rotation axes of the upper roll 37 and the lower roll 38 are established so as to become parallel with respect to the worm shaft 12, and are established so as not to move in an up-and-down direction That is, movement of the upper roll 37 and lower roll 38 in the up-and-down direction is prevented.

In the power steering apparatus 30, the worm shaft 12 is supported by the distortion prevention unit 35 at the middle in the longitudinal direction of the worm shaft 12. This is because the amount of distortion of the worm shaft 12 tends to be highest at the middle in the longitudinal direction of the worm shaft 12. In the third preferred embodiment, since the middle in the worm shaft 12 is pushed by the distortion prevention unit 35, distortion of the worm shaft 12 is reliably avoided. As a result, the variation of the steering feeling may be avoided, and the assistant steering force generated by the electric motor 7 may be reliably transmitted to the pinion shaft 4. In other words, the operational ability of the steering wheel is not impaired.

In the present invention, since the middle in the longitudinal direction of the worm shaft 12 is pushed by the distortion prevention unit 35, distortion of the worm shaft 12 can be avoided. Thus, the operational ability of the steering wheel is not impaired.

In the third preferred embodiment, furthermore, since the distortion prevention unit 35 has the engagement assistor 34, so that the force brought by the spring 36 is transmitted to the worm shaft 12 through the upper roll 37 and the lower roll 38, the clearance between the worm gear 12A and the worm wheel 11 is maintained. This may be true even if the clearance occurs as a result of a slight inherent flexure of the worm shaft 12.

In the third preferred embodiment, the worm gear 12A and the worm wheel 11 are reliably engaged, so that backlash between the worm gear 12A and the worm wheel 11 may be avoided. Thus, the assistant steering force generated by the electric motor 7 may be reliably transferred to the worm wheel 11 through the worm shaft 12.

In the third preferred embodiment, since the upper roll 37 and the lower roll 38 are rotatable, the rotation of the worm shaft 12 is not prevented by the upper roll 37 and lower roll 38 when the worm shaft 12 is pushed toward the worm wheel 11 by the distortion prevention unit 35.

In the third preferred embodiment, additionally, the upper roll 37 and the lower roll 38 are restricted from moving in the up-and-down direction. Thus, since the worm shaft 12 is prevented from moving in the up-and-down direction by the upper roll 37 and the lower roll 38, distortion of the worm shaft 12 in the up-and-down direction is also prevented.

Thus, the assistant steering force is reliably transferred to the steering system. According to the supporting mechanism of the present invention, since the worm shaft 12 is supported by the upper roll 37 and lower roll 38, the supporting mechanism can be made with reduced friction.

In the third preferred embodiment as described, both ends of the worm shaft 12 are held by the ball bearings 32 and 32, but the supporting manner of the worm shaft 12 is not restricted to this. The supporting manner, for example, in which the ball bearing 33 that supports the second end of the worm shaft 12 is omitted, may be acceptable as long as the distortion of the worm shaft 12 is prevented by the distortion prevention unit 35.

In the above preferred embodiments, a power steering apparatus, which assist the steering effort of the driver by adding the assist steering force brought by the electric motor in addition to the steering force brought by the driver's operation, is described.

The application of the present invention is not restricted to the above-described embodiments. Other types of construction may be acceptable as long as the diving force generated by the electric motor is added to the pinion shaft through the worm wheel and the worm shaft. For example, a steer-by-wire mechanism, in which the steered wheel is steered only by the driving force that is generated by the electric motor, and a four-wheel-steering mechanism may be considered.

As described above, in the present invention, the worm shaft 12 is supported with sufficient flexural rigidity by supporting the worm shaft without play. According to this invention, since the distortion of the worm shaft 12 is prevented, the difficulties caused by the distortion of the worm shaft 12 when turning the steering in different directions is prevented. As a result of this prevention, impairment of the steering may be avoided, and the assistant steering force generated by the electric motor can be reliably transmitted to the pinion shaft.

In the present invention, both ends of the worm shaft are held by ball bearings, respectively. According to this invention, the worm shaft 12 is held without play, so as to permit rotation of the worm gear 12A. Since ball bearings are general-purpose components, furthermore, their use can contribute to a cost reduction.

In the present invention, both ends 12B and 12C of the worm shaft 12 are held with uniform flexural rigidity. This is accomplished by supporting the second end 12C, where the flexural rigidity is relatively low, using a needle bearing. According to this invention, the distortion of the worm shaft 12 is reliably prevented and also the operational ability of the steering wheel is not impaired. The assistant steering force generated by the electric motor 7 is reliably transferred to the pinion shaft 3.

In the present invention, distortion of the worm shaft 12 can be prevented while the worm shaft nevertheless is free to rotate. According to this invention, impairment of the steering may be avoided, and the assistant steering force generated by the electric motor can be reliably transmitted to the pinion shaft.

In the present invention, since the worm shaft 12 is pushed toward engagement with the worm wheel 11 by the supporting units, the clearance between the worm shaft 12 and the worm wheel 11 can be maintained within a predetermined range. According to the present invention, since the occurrence of backlash between the worm gear 12 and the worm wheel 11 is avoided, the rotation of the worm shaft 12 is reliably transmitted to the worm wheel 11.

In the present invention, displacement of the worm shaft 12 in the up-and-down direction is restricted. The worm shaft 12 is pushed toward engagement with the worm wheel while the worm shaft 12 nevertheless remains rotatable. According to the invention, since rollers 37 and 38 are used, friction the worm gear can be reduced.

What is claimed is:

1. An electric power steering apparatus comprising;

an electric motor generating an assistant steering force a worm shaft engaged with said electric motor so as to be rotated by the assistant steering force thereof;

a worm gear disposed on said worm shaft, and engaged with said worm shaft so as to rotate therewith;

a worm wheel engaged with said worm gear so as to be rotated thereby;

a pinion shaft engaged with said worm wheel so as to rotate therewith;

a rack shaft engaged with at least one steered wheel so as to displace said at least one steered wheel along an axial direction thereof, said rack shaft being engaged with said pinion shaft so as to displace said at least one steered wheel as said pinion shaft rotates;

first and second supporting units supporting first and second ends of said worm shaft such that said worm shaft is rotatable, and a distortion prevention unit engaged with said worm shaft at a middle in a longitudinal direction thereof, such that said worm shaft is rotatable, said distortion prevention unit including an engagement assistor, said engagement assistor pushing said worm shaft toward engagement with said worm wheel, said engagement assistor including a first roller, a second roller adjacent said first roller, and a spring, said spring pushing said first and second rollers against said worm shaft, wherein said first and second rollers are arranged such that said worm shaft is disposed centrally to said first roller and said second roller.

2. An electric power steering apparatus according to claim 1, wherein said first and second supporting units support said first and second ends of said worm shaft without play.

3. An electric power steering apparatus according to claim 2, wherein said first supporting unit comprises at least one ball bearing.

4. An electric power steering apparatus according to claim 2, wherein said second supporting unit comprises at least one ball bearing.

5. An electric power steering apparatus according to claim 2, wherein said second supporting unit comprises a needle bearing.

6. An electric power steering apparatus according to claim 1, wherein said second end of said worm shaft is joined with said electric motor.

* * * * *